US008819303B2

(12) United States Patent
Venugopal et al.

(10) Patent No.: US 8,819,303 B2
(45) Date of Patent: Aug. 26, 2014

(54) DEFERRED TRANSFER OF CONTENT TO OPTIMIZE BANDWIDTH USAGE

(75) Inventors: Ajith Venugopal, Bangalore (IN); Anita Ramachandran, Bangalore (IN)

(73) Assignee: General Instrument Corporation, Horsham, PA (US)

( * ) Notice: Subject to any disclaimer, the term of this patent is extended or adjusted under 35 U.S.C. 154(b) by 369 days.

(21) Appl. No.: 13/190,427

(22) Filed: Jul. 25, 2011

(65) Prior Publication Data

US 2013/0031279 A1 Jan. 31, 2013

(51) Int. Cl.
*G06F 3/00* (2006.01)
*G06F 5/00* (2006.01)
*H04M 15/00* (2006.01)
*H04L 12/14* (2006.01)
*H04L 29/08* (2006.01)
*H04L 12/24* (2006.01)

(52) U.S. Cl.
CPC ....... *H04L 12/1492* (2013.01); *H04M 15/8083* (2013.01); *H04L 67/322* (2013.01); *H04L 67/325* (2013.01); *H04M 15/80* (2013.01); *H04L 12/1435* (2013.01); *H04L 41/5029* (2013.01)
USPC .................................. 710/18; 710/29; 710/39

(58) Field of Classification Search
None
See application file for complete search history.

(56) References Cited

U.S. PATENT DOCUMENTS

| 6,003,082 | A | 12/1999 | Gampper et al. |
|---|---|---|---|
| 6,965,913 | B2 | 11/2005 | Levitan |
| 6,996,393 | B2 | 2/2006 | Pyhalammi et al. |
| 7,305,464 | B2 | 12/2007 | Phillipi et al. |
| 7,336,613 | B2 | 2/2008 | Lloyd et al. |
| 7,417,992 | B2 | 8/2008 | Krishnan |
| 7,619,973 | B2 | 11/2009 | Richardson et al. |
| 7,664,034 | B1 | 2/2010 | Eatough et al. |
| 7,720,050 | B1 | 5/2010 | Blank |
| 7,936,674 | B2 | 5/2011 | Aris et al. |
| 2003/0186704 | A1 | 10/2003 | Tamura et al. |
| 2005/0149927 | A1* | 7/2005 | Abe .............................. 718/100 |
| 2005/0257214 | A1 | 11/2005 | Moshir et al. |
| 2006/0165108 | A1 | 7/2006 | Uysal |

(Continued)

FOREIGN PATENT DOCUMENTS

EP 1077557 A1 2/2001
EP 1168880 B1 10/2004

(Continued)

OTHER PUBLICATIONS

PCT Search Report & Written Opinion, RE: Application #PCT/US2012/043990; Sep. 21, 2012.

(Continued)

*Primary Examiner* — Zachary K Huson
(74) *Attorney, Agent, or Firm* — Lori Anne D. Swanson (57) ABSTRACT

In one embodiment, a method includes determining a request for a transfer of content where the request is associated with a user device. It is determined if a deferred transfer should be performed. The deferred transfer defers the transfer of the content with a completion by a completion time. The request is stored in a queue where the request is associated with the completion time. The method processes the request from the queue to transfer the content at a start time. The content is transferred by the completion time. The method then adjusts, for a user associated with the user device, a charging parameter for the transfer due to the transfer being deferred.

20 Claims, 7 Drawing Sheets

(56) References Cited

U.S. PATENT DOCUMENTS

| | | |
|---|---|---|
| 2007/0008884 A1 | 1/2007 | Tang |
| 2007/0036174 A1 | 2/2007 | Aris et al. |
| 2007/0082654 A1 | 4/2007 | Hovnanian et al. |
| 2008/0049747 A1 | 2/2008 | McNaughton et al. |
| 2008/0101405 A1 | 5/2008 | Wirick et al. |
| 2008/0235360 A1 | 9/2008 | Li et al. |
| 2008/0259796 A1 | 10/2008 | Abousleman et al. |
| 2009/0187955 A1 | 7/2009 | Sullivan et al. |
| 2009/0248927 A1 | 10/2009 | Hacking et al. |
| 2010/0020685 A1 | 1/2010 | Short et al. |
| 2010/0057690 A1 | 3/2010 | Chu et al. |
| 2011/0055413 A1* | 3/2011 | Lobsenz .................. 709/231 |
| 2011/0066752 A1 | 3/2011 | Lippincott et al. |
| 2012/0155380 A1* | 6/2012 | Hodges .................. 370/328 |

FOREIGN PATENT DOCUMENTS

| | | |
|---|---|---|
| WO | 03/019796 A2 | 3/2003 |
| WO | 03034763 A1 | 4/2003 |
| WO | 2006/063868 A1 | 6/2006 |

OTHER PUBLICATIONS

Alcatel-Lucent, "A smart approach to managing the mobile video expansion", Mobile SmartLoading, Dated Oct. 7, 2010. http://www.alcatel-lucent.com/wps/portal/Locator?LMSG_CABINET=Docs_and_$_{Resource\_}$Ctr&LMSG_CONTENT_FILE=Other/A-smart-approach-to-managing-the-mobile-video-explosion.pdf&UNIQUE_NAME=&lu_lang_code=en_WW.

* cited by examiner

| RATE | DATA TRANSFER | ADJUSTMENT | | |
|---|---|---|---|---|
| | | < 4 | < 8 | < 1 DAY |
| $20.00 | 2 GB | $18.00 | $15.00 | $12.00 |
| $0.20/ MB | > 2 GB | $0.15/ MB | $0.10/ MB | $0.05/ MB |

DEFERRED TRANSFER OF CONTENT TO OPTIMIZE BANDWIDTH USAGE

BACKGROUND

Particular embodiments generally relate to content delivery systems.

The amount of content being transferred (e.g., downloaded/uploaded) in networks is increasing due to a larger number of users transferring files of a larger size. For example, the sharing of videos and other multimedia content through various services, such as video-on-demand, causes the download of large amounts of content at one time. Users typically download content during specific times during the day. For example, peak download times may occur in the morning or evening, which may result in network congestion. During the peak times, Internet service providers (ISPs) may have to purchase extra bandwidth to deliver the content. Then, at other times, the network bandwidth may be under-utilized.

Some download managers allow users to manage downloads by pausing and resuming, queuing, scheduling, and searching for downloads. However, this functionality is based on the user's needs and does not take into account current network conditions. Thus, it is possible that network congestion may become worse by allowing users more control over the downloads.

Some rate plans that are offered by Internet service providers offer a fixed download plan. For example, a rate plan may provide a fixed amount of data for download (xGB) for a fixed price ($y). Any data downloaded above the fixed amount is charged at a rate of $z per additional data unit (e.g., megabyte (MB)). For example, one plan could be a fixed price of $20 per month for a total of 2 gigabytes (GBs) data downloaded and an additional $0.10 per additional MB downloaded over 2 GBs. Due to the fixed download plan, customers may defer downloading content after the fixed amount is reached. This may alleviate bandwidth congestion; however, the ISPs may make a large amount of revenue from downloads above the fixed limit. Thus, ISPs may desire that users continue to download once the limit has been reached, but ISPs are still faced with network congestion problems.

SUMMARY

In one embodiment, a method includes determining a request for a transfer of content where the request is associated with a user device. It is determined if a deferred transfer should be performed. The deferred transfer defers the transfer of the content with a completion by a completion time. The request is stored in a queue where the request is associated with the completion time. The method processes the request from the queue to transfer the content at a start time. The content is transferred by the completion time. The method then adjusts, for a user associated with the user device, a charging parameter for the transfer due to the transfer being deferred.

In one embodiment, the method includes outputting one or more options for deferring the transfer of content and receiving an input from the user selecting an option in the one or more options.

In one embodiment, the method includes analyzing a set of requests in the queue to determine if the completion time for the request for deferred transfer is determined to be achievable. If it is determined the completion time is not achievable, a priority for the request for deferred transfer is adjusted.

In one embodiment, the analyzing includes determining an amount of content for the request and determining the start time for the request. Expected network traffic rate is determined after the start time and it is determined if the amount of content can be transferred and completed by the completion time based on the start time and the expected network traffic rate.

In another embodiment, a method includes determining a request for a transfer of content associated with a user device for a user. The user is being charged using a rate plan providing a fixed amount of content transfer for a first charging rate and a second charging rate per unit transferred above the fixed amount. A set of deferral options is determined where a deferral option includes a deferred time for transfer and a charging rate adjustment for the first charging rate or the second charging rate. The method determines a deferred transfer should be performed based on a selected deferral option in the set of deferral options where the deferred transfer deferring the transfer of the content. The content is transferred based on the deferred time for the selected option and the first charging rate or the second charging rate is adjusted due to the transfer being deferred.

In another embodiment, a non-transitory computer-readable storage medium is provided. The non-transitory computer-readable storage medium contains instructions for controlling a computer system to be operable to: determine a request for a transfer of content, the request associated with a user device; determine a deferred transfer should be performed, the deferred transfer deferring the transfer of the content with a completion by a completion time; store the request in a queue, wherein the request is associated with the completion time; monitor the request in the queue to determine if the deferred transfer can be completed by the completion time; process the request from the queue to transfer the content at a start time, the content being transferred by the completion time; and adjust, for a user associated with the user device, a charging parameter for the transfer due to the transfer being deferred.

The following detailed description and accompanying drawings provide a more detailed understanding of the nature and advantages of the present invention.

DETAILED DESCRIPTION

Described herein are techniques for a deferred content transfer system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
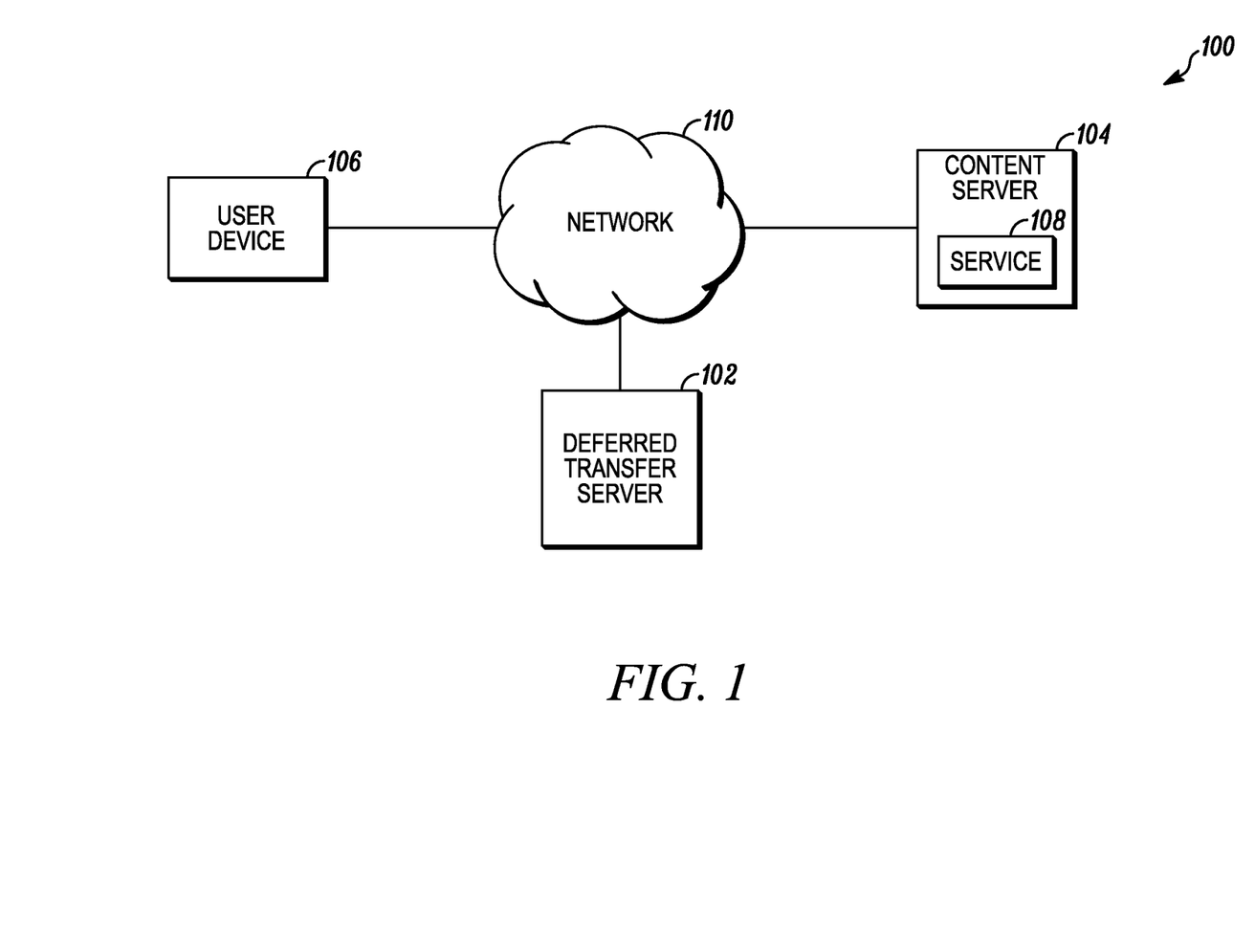
FIG. 1 depicts a system for providing deferred transfer of content according to one embodiment.

FIG. 1 depicts a system 100 for providing deferred transfer of content according to one embodiment. System 100 includes a deferred transfer server 102, a content server 104, and a user device 106. Content is transferred through a network 110. The transfer of content may refer to the download or upload of content between entities coupled to network 110. In one embodiment, content is downloaded from content server 104 to user device 106. For example, content server 104 may provide a service 108 that transfers data through network 110 to user device 106. Additionally, user device 106 may upload content to network 110. The content may be uploaded to content server 104 or to other devices (not shown), such as other user devices 106, servers, etc. When the terms download or upload are used, it will be understood that when one term is used, the discussion may also applicable to the other term.

In one example, user device 106 may be a computing device, such as a personal computer, smart phone, cellular phone, tablet device, cable modem, or other computing device. A user may download content, such as a video, from service 108. Service 108 may be any service that provides content, such as an on-demand video service, web-site, and music download service. Content server 104 transfers the content through network 110, which may be associated with a service provider. For example, an Internet service provider (ISP) is associated with network 110 and charges the user for the downloading of the content.

The ISP may charge the user using different plans. For example, a fixed download plan offers a fixed amount of data for download for a fixed price and any data downloaded above the fixed amount is charged at a rate per additional data unit. Other plans may also be used, such as an unlimited download plan for a fixed price.

Deferred transfer server 102 may defer a transfer of content requested by a user. In return for the deferral, the user may be provided with an adjustment in a charging parameter. The charging parameter may be based on the plan associated with the user. For example, if the user subscribes to a fixed download plan, then the charge for an amount of data above the user's limit may be charged at a reduced rate. Also, in deferring the transfer, deferred transfer server 102 may monitor whether the later delivery of the content is predicted to meet a completion time and take steps to ensure that the content is downloaded by that completion time.

Figure 2:
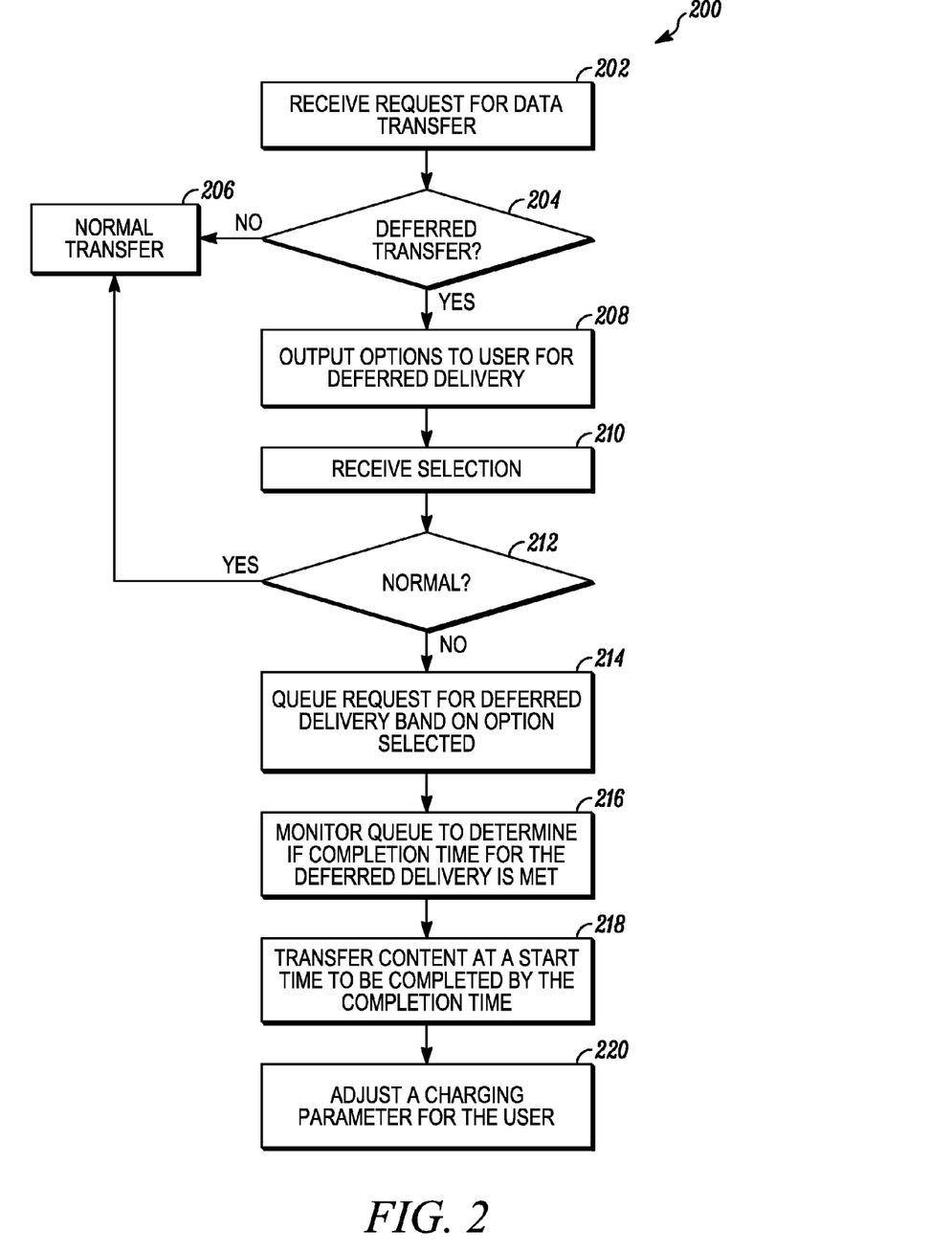
FIG. 2 depicts a simplified flowchart of a method for deferring transfer of the content according to one embodiment.

When a request for content is determined, deferred transfer server 102 may intercept the request and determine whether to defer the transfer of content. FIG. 2 depicts a simplified flowchart 200 of a method for deferring transfer of the content according to one embodiment. At 202, deferred transfer server 102 receives a request for a data transfer. For example, user device 106 may request a transfer of content from service 108 and the request is redirected to deferred transfer server 102.

At 204, deferred transfer server 102 determines if a deferred transfer should be performed. Different criteria may be used to determine whether to defer transfer, the process of which will be described in more detail below. If a deferred transfer is not determined, at 206, a non-deferred transfer is performed. For example, the content may be delivered in real-time to complete the request. The user also is charged a non-deferred rate for the transfer.

At 208, if a deferred transfer is determined, deferred transfer server 102 outputs options to a user for deferred delivery. For example, the options may be different choices for later download times (e.g., download within 4 hours, 8 hours, and 1 day) in addition to normal delivery. The download times also include a completion time in which delivery of the content should be completed. As will be noted below, in some cases, a fallback option (e.g., free delivery) is used when the content cannot be delivered by the completion time. However, to avoid missing the completion time, deferred transfer server 102 may take steps described below to adjust parameters (e.g., quality of service (QoS) parameters) for content delivery in an attempt to make sure the content is delivered by the completion time.

The options may include changes to charging parameters for the user. For example, different rates for downloading data for a fixed amount may be provided, such as for a 4 hour deferral, the rate charged may be X/2 (where X is the rate charged per MB above the fixed amount) and for an 8 hour deferral, the rate charged may be X/4.

At 210, deferred transfer server 102 receives a selection of one of the options for deferred delivery. For example, a user may select an option using user device 106. Although communication with the user is described to receive a selection of an option, other methods may be used to determine the selection. For example, a user may set preferences on deferred delivery in a user profile. The preferences may indicate that a deferred delivery should be performed based on certain criteria. The criteria may be compared to characteristics of the download to determine if deferral of delivery may be performed. For example, the user may specify downloads over a certain amount should be deferred.

At 212, deferred transfer server 102 determines if a normal delivery transfer was selected. If so, at 206, a normal transfer of the content is performed.

If a deferred delivery option is selected, deferred transfer server 102 queues the request for deferred delivery based on the option selected. Delivery parameters may be set for the request, such as different completion times may be associated with the request based on which option was selected by the user. Additionally, quality of service (QoS) parameters may be set to ensure that delivery is performed in a way that the transfer of the content is finished by the completion time. In queuing the request, a new request may also be generated and queued in place of the received request.

At 216, deferred transfer server 102 monitors the queue to determine if the completion time for the deferred delivery is expected to be met. The queue includes a number of requests for content that need to be processed. The deferred delivery is used to defer delivery of large content transfers to a time in which more network bandwidth is expected to be available, such as during non-peak times on network 110. However, certain conditions may occur that may affect whether the delivery of the content can be completed by the completion time. For example, network bandwidth may become constrained or an abnormal number of requests may need to be satisfied. As will be described in more detail below, requests in the queue may be monitored and an analysis is performed to determine if the completion time can be met for a request in the queue. Different actions may be taken to ensure that the completion time is met for the request, such as changing QoS parameters. This may deliver the content for the request with increased level of performance to meet the completion time for the delivery of the content. This process will be described in more detail below.

At 218, deferred transfer server 102 transfers the content at a start time to user device 106. The content is transferred such that it is completed by the completion time that was selected in the option. In one embodiment, the data transfer starts between a window provided by a start time and the completion time, but the content transfer may also start at any time, such as when it is detected that network traffic is low.

At 220, deferred transfer server 102 adjusts a charging parameter for the user. For example, the rate charged for data transfers above a fixed amount may be adjusted. Other adjustments may also be contemplated and are described in more detail below.

Figure 3:
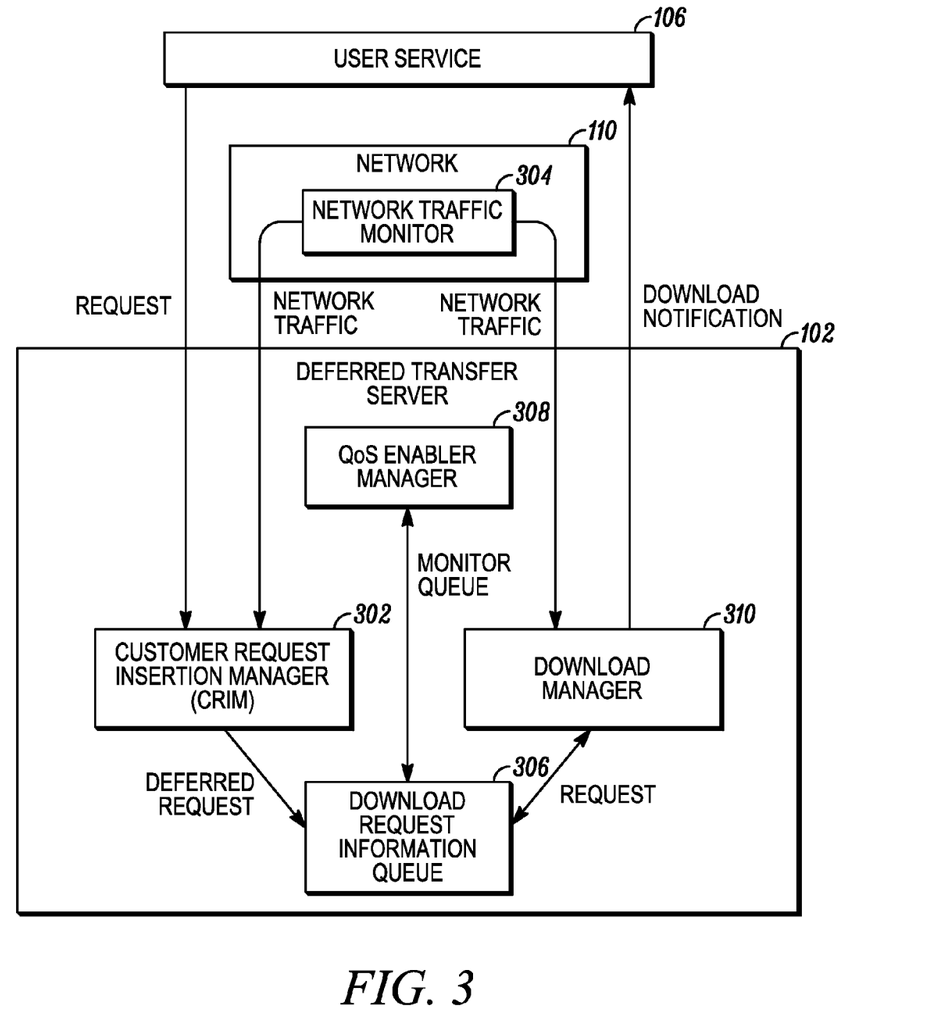
FIG. 3 depicts a more detailed example of a deferred transfer server according to one embodiment.

FIG. 3 depicts a more detailed example of deferred transfer server 102 according to one embodiment. A customer request insertion manager (CRIM) 302 includes an interface to communicate with user device 106 to determine if a deferred transfer should be performed. For example, insertion manager 302 receives a request for transfer of content that has been made by user device 106. Insertion manager 302 then determines if the deferred transfer should be performed. For example, the current network traffic, amount of content to be downloaded, and user preferences (completion time, fallback option, rates) may be used to determine if deferred delivery should be offered.

If deferral is determined, insertion manager 302 can then calculate the various options for deferred transfer. These options may be fixed or generated dynamically at run-time. For example, different windows of time to perform the transfer and different adjustments to the charging parameter may be calculated. Various factors may be used to determine the window of time, such as the time at which the transfer is expected to be completed, the expected network traffic at the completion time, and the size of the content transfer. The options may also be standard options that are not calculated at run-time. For example, 4 hour, 8 hour, and 1 day deferral options may be used. A fallback option (e.g., a free download if not able to complete the transfer before the completion time) may also be provided. The user may not agree to the fallback option, and this case, it is mandatory that the download be completed before the completion time.

Figure 4:
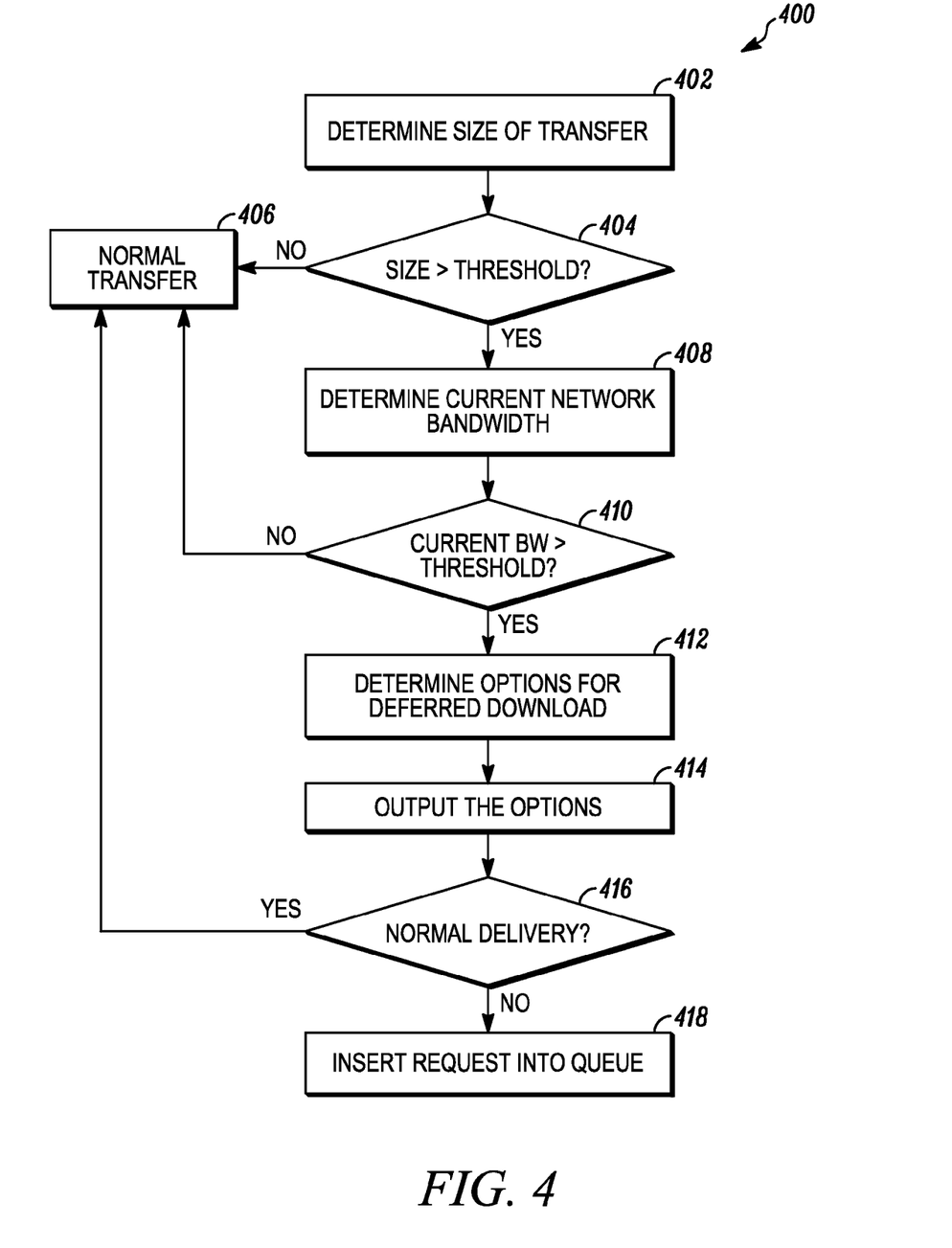
FIG. 4 depicts a simplified flowchart of a method for determining if a deferred transfer should be offered according to one embodiment.

FIG. 4 depicts a simplified flowchart 400 of a method for determining if a deferred transfer should be offered according to one embodiment. At 402, insertion manager 302 determines a size of the content requested. At 404, insertion manager 302 determines if the size of the transfer is greater than a threshold. For example, a service provider may only want to defer transfers of content that are considered large. Smaller transfers of data may not be deferred because the service provider may not want to offer the charge adjustment to the user or the download may be small enough that it may not cause network congestion. In other examples, deferred transfers may be offered regardless of the size of the transfer.

If the size of the data transfer is below the threshold, then at 406, a normal transfer is performed. If the size of the data transfer is above the threshold, insertion manager 302 determines network bandwidth. In one embodiment, a network traffic monitor 304 may be situated in network 110 and is monitoring the current conditions of network 110. Insertion manager 302 receives the current network traffic from network traffic monitor 304. For example, the current network bandwidth may be determined when a request is received by querying network traffic monitor 304. In other examples, network traffic monitor 304 may periodically send updates of network bandwidth to customer request insertion manager 302 and the latest network bandwidth reading is used. Also, historical data may also be used to determine the network bandwidth. For example, patterns of prior network usage may be sufficient to predict network bandwidth.

At 410, customer request insertion manager 302 determines if the current network bandwidth is greater than a threshold. For example, if current network bandwidth is low, then the service provider may not want to defer transfer of the content because network bandwidth can be efficiently used at this time. Also, deferring transfer when network bandwidth is low would provide users with a lower charge that may not be necessary. Thus, if the current network bandwidth is lower than a threshold, at 406, normal transfer of the content is performed. In other examples, deferred transfers may be offered regardless of the network bandwidth.

If the current network bandwidth is greater than the threshold, then at 412, insertion manager 302 determines options for deferred transfer. For example, historical network data may be used that indicates when peak and non-peak times for network traffic have occurred. Insertion manager 302 may then determine which times are optimal for deferring the transfer in real-time. In another embodiment, standard deferral options may be used. For example, a standard option of delivery within 4 hours, delivery within 8 hours, delivery within 1 day, or normal delivery may be always provided to a user. Additionally, insertion manager 302 may determine any user preferences for deferred transfer. For example, the user may set preferences in a user profile that indicate what options should be provided. At 414, insertion manager 302 outputs the options determined to user device 106.

At 416, it is determined if the option selected is normal delivery. If so, then, at 406, the content is transferred immediately. If not, at 418, the request is inserted into a download request information queue 306.

Referring back to FIG. 3, assuming a deferred transfer of content is requested, insertion manager 302 sends the request to queue 306. The request may be a new request that is created or may be the original request that is adjusted with different parameters due to the deferred download (e.g., a completion time is associated with the request). Queue 306 may be a cache memory, such as a shared memory, for storing pending transfer requests.

The requests may be stored in a data structure, such as a linked list, that is traversed to determine which requests to perform. The requests in queue 306 may have parameters set for the deferred delivery. For example, parameters such as QoS parameters, a target completion time, a fallback option, and content delivery parameters (e.g. uniform resource locator (URL) for the content and user device details, such as an Internet protocol (IP) address), and a pointer to a next node in the linked list may be associated with the request in queue 306. The request may be inserted into queue 306 at a position based on the parameters. For example, the amount of content to download, QoS parameters, network traffic, and fallback option may affect where in the queue 306 the request is inserted.

A QoS enabler manager 308 monitors queue 306 to determine if any parameters need to be changed such that the content is transferred by the target completion time. For example, all requests may be analyzed in queue 306 to determine if the request can be completed by the completion time. Conditions that may be analyzed include active requests in queue 306, real-time network traffic or historical data for network traffic, and completion times.

Figure 5:
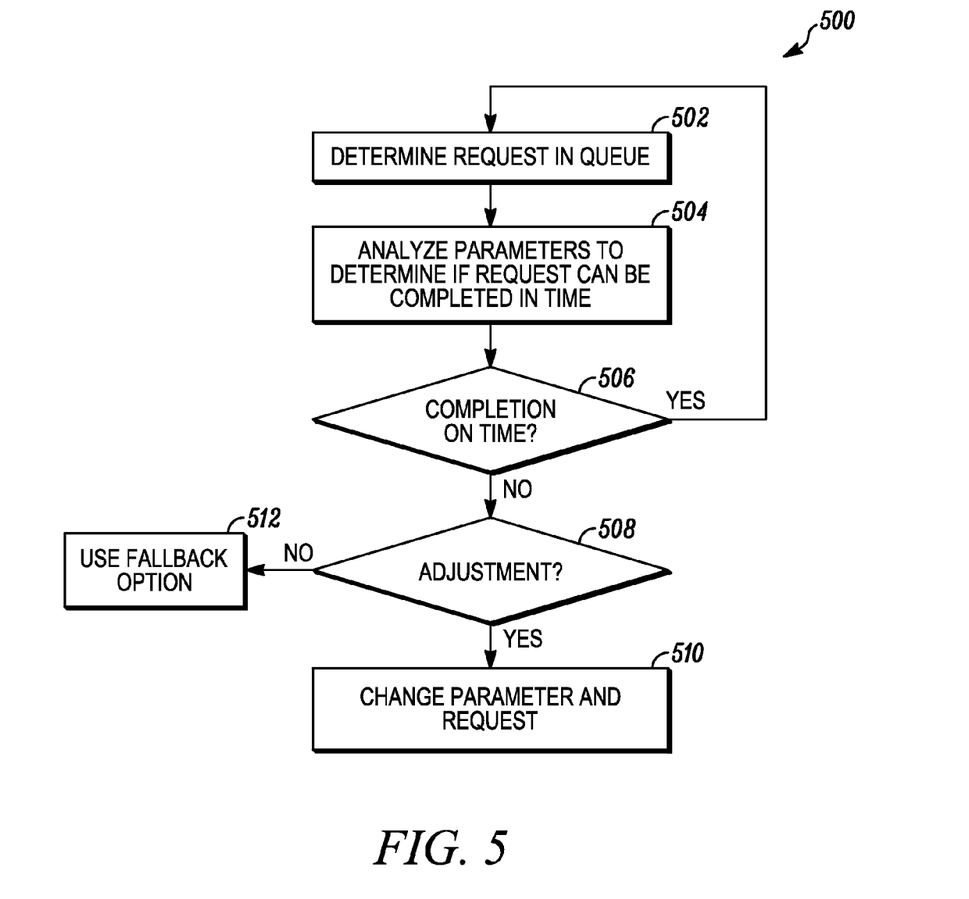
FIG. 5 depicts a simplified flowchart of a method for processing requests in a linked list according to one embodiment.

FIG. 5 depicts a simplified flowchart 500 of a method for processing requests in a linked list according to one embodiment. A daemon thread may execute periodically to perform the following process.

At 502, QoS enabler manager 308 determines a request in queue 306. For example, the requests may be organized as nodes in the linked list. The linked list is traversed from a start node to an end node to determine if each request can be processed within each request's completion time.

At 504, QoS enabler manager 308 analyzes parameters for the request to determine if the request can be completed by the completion time. For example, the analysis may use the amount of the content to be transferred, a current network traffic rate, an expected time to start the transfer, and the expected network traffic rate during an expected transfer time, and/or the current status of the transfer (e.g., how much data has been downloaded for a request) to simulate whether the request can be completed by the completion time. In one example, the simulation may determine an amount of content to be transferred and a start time. The expected network bandwidth is then used to determine if the amount of content can be transferred by the completion time. Other methods may also be used to simulate whether the transfer can be completed by the completion time.

At 506, QoS enabler manager 308 determines if the transfer can be completed on time. If the content transfer can be completed on time, then the process continues to analyze another request in queue 306 at 502. If QoS enabler manager 308 determines the request cannot be completed on time, then at 508, QoS enabler manager 308 determines if an adjustment can be made so that the completion time for the request can be met. For example, the request may be moved to a different node in the linked list. This may adjust the priority assigned to the request. For example, nodes higher in the linked list may be processed for delivery sooner. Also, QoS parameters may be adjusted. In one example, resource reservation protocol (RSVP) parameters may be set or adjusted (e.g., increased or decreased) for this request. The RSVP parameters are used to reserve resources for delivering the content. Other parameters may also be adjusted to ensure delivery of the content before the completion time. At 510, if an adjustment can be made, QoS enabler manager 308 changes a parameter for the request.

In some cases, the priority may not be able to be adjusted such that the completion time can be met and the fallback option may need to be relied upon. In this case, at 512, QoS enabler manager 308 uses the fallback option. The fallback option may provide an increased incentive to the user, such as a free transfer for this request in return for not being able to meet the completion time. In some cases, the user may indicate the fallback option is not available. In this case, QoS enabler manager 308 may attempt to change parameters of other nodes so the current request can be completed on time.

Referring back to FIG. 3, download manager 310 processes requests for transferring content. For example, download manager 310 may monitor current network traffic data received from network traffic monitor 304 and QoS parameters needed for RSVP. Based on the network traffic, QoS parameters, and completion times, download manager 310 determines when to process requests from queue 306. The transfer may be pushed to a user if user device 106 is available. Also, the user may be informed the transfer is ready and the user can pull the content from content server 104. When the transfer is complete, download manager 310 can then send the status of the transfer to user device 106.

Figure 6:
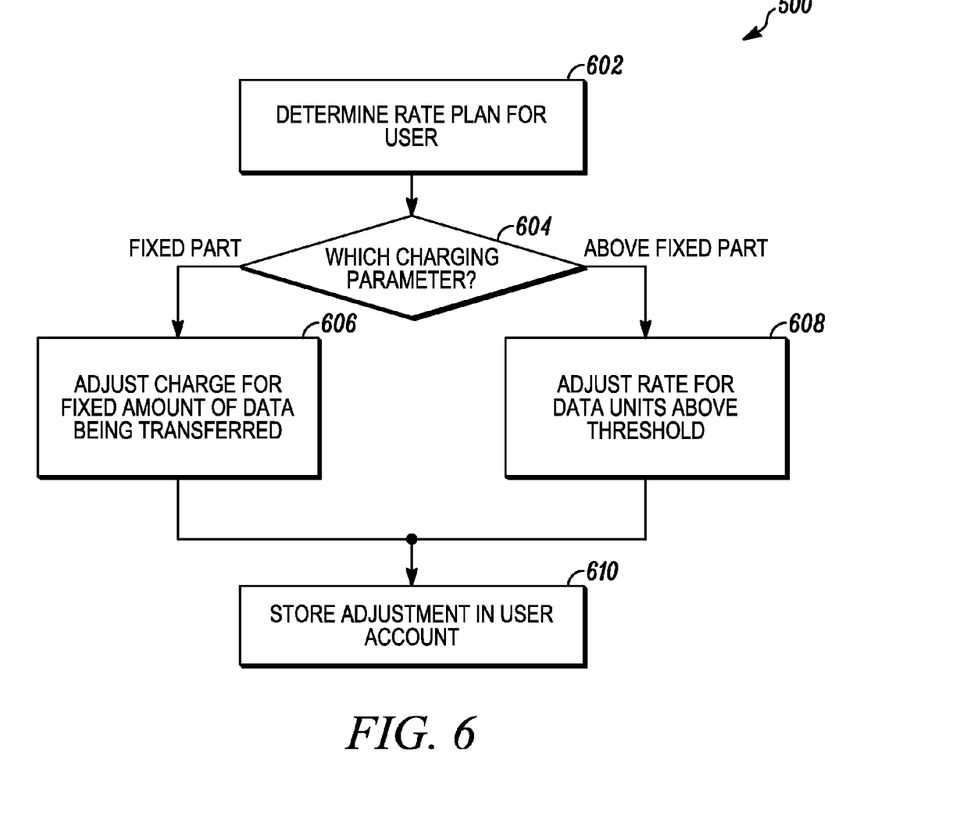
FIG. 6 depicts a simplified flowchart of a method for processing an adjustment to a charging parameter according to one embodiment.

Once the download is complete, the adjustment of a charging parameter may then be performed. FIG. 6 depicts a simplified flowchart 600 of a method for processing an adjustment to a charging parameter according to one embodiment. At 602, deferred transfer server 102 determines a rate plan for a user. For example, a user may have a fixed download plan as discussed above. Although this rate plan is discussed, particular embodiments may be used with other rate plans. For example, an unlimited download plan may also be used where charge for the unlimited download may be adjusted. For example, if the plan charges $20 for an unlimited amount of download, the charge may be reduced to $18 if deferred transfer is selected.

At 604, deferred transfer server 102 determines a charging parameter to adjust. For example, different changes to the charging parameter may be provided depending on whether the user is above or below the fixed amount because if the user is not above the fixed amount, then an incentive to charge less per data unit above the fixed amount for the deferred delivery would not be attractive to the user. Other adjustments may also be appreciated.

At 606, deferred transfer server 102 may perform an adjustment for charge based on the fixed amount part of the rate plan. For example, the fixed amount may be for 2 GB. If the amount of the download is 1 GB, then, the user's account may only be charged with 0.5 GB of data transferred if deferred transfer is selected. Additional adjustments may also be used, such as the fixed charge may be reduced. For example, if the user is paying $20.00 for 2 GB of data, then the $20.00 may be reduced to $18.00 for 2 GB of data if deferred transfer is selected. Other adjustments may also be contemplated.

At 608, deferred transfer server 102 adjusts the second part of the rate plan. For example, if the user is being charged $0.20 for every MB transferred above 2 GB, then that rate may be reduced to $0.15 for this transfer. Other adjustments may also be appreciated.

At 610, the adjustment may be stored in a user account. For example, the rate change may be noted in the user account in a transaction. Additionally, the user may also be notified of the adjustment at user device 106.

Figure 7:
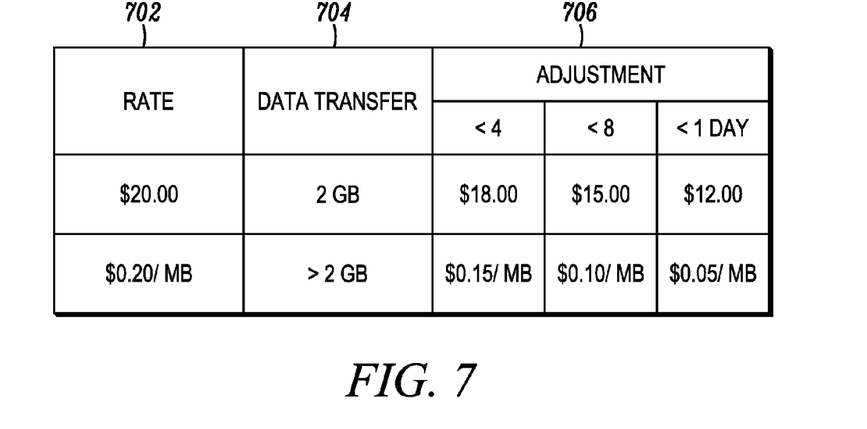
FIG. 7 summarizes the adjustments according to one embodiment.

FIG. 7 summarizes the adjustments according to one embodiment. In a first column 702, the rate charged is summarized along with in a column 704 the amount of data being transferred for the rates. As shown, $20.00 is charged for a fixed amount of 2 GB of data being transferred. Any data transferred over 2 GB is charged at $0.20 per MB. In a column 706, the adjustment for deferred download is provided. For example, if the deferral option is transfer within four hours, then the $20.00 rate may be reduced to $18.00 and/or the $0.20 per MB may be reduced to $0.15 per MB. If the deferral option used is less than 8 hours, then the $20.00 rate may be reduced to $15.00 and the $0.20 rate may be reduced to $0.10. If the less than 1 day deferral option is selected, then the fixed amount may be reduced to $12.00 and the $0.20 rate may be reduced to $0.05 per MB. Other options may also be determined.

Figure 8:
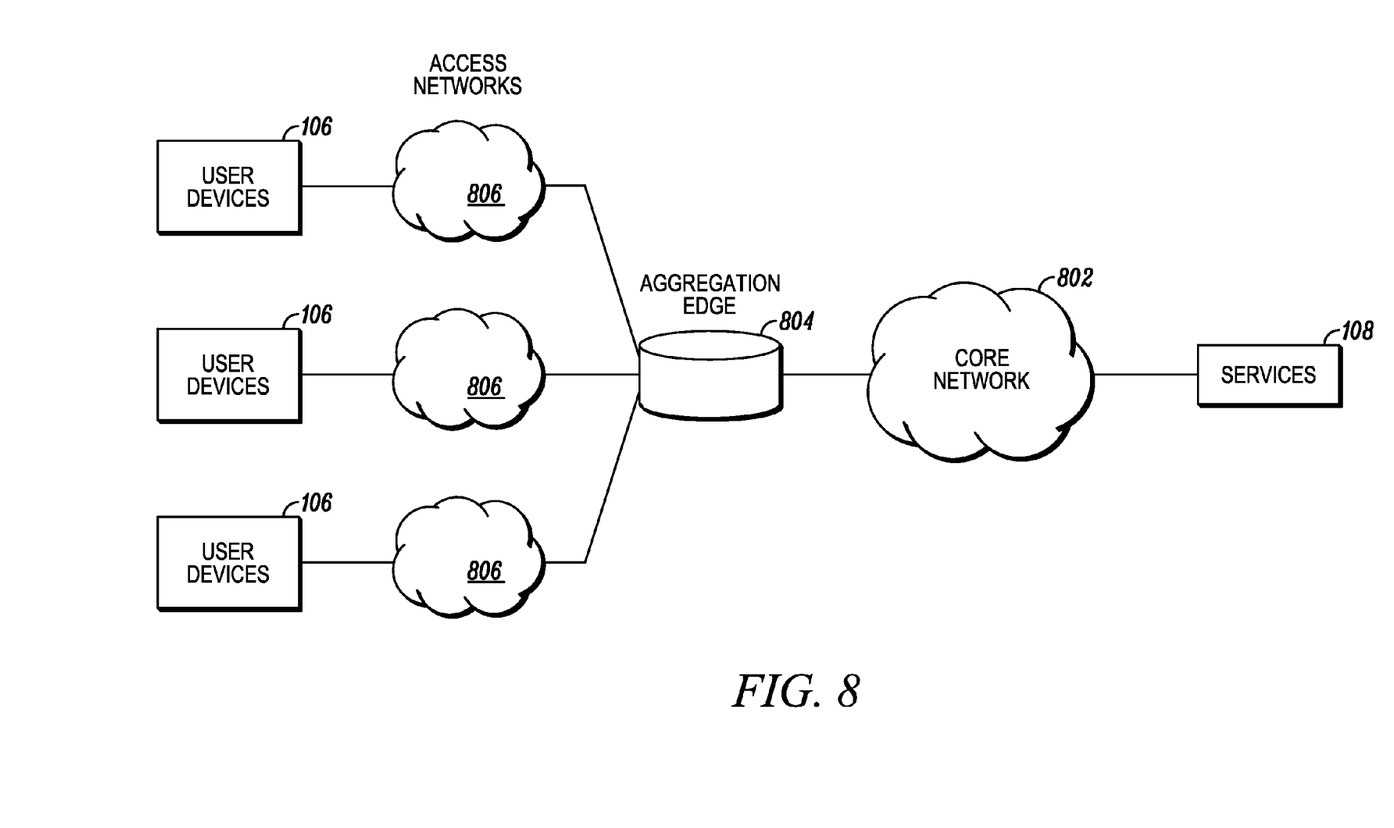
FIG. 8 shows an example of a network that may be used to deliver content according to one embodiment.

FIG. 8 shows an example of a network 110 that may be used to deliver content according to one embodiment. In one embodiment, network 110 is a broadband network (e.g., cable or digital subscriber line (DSL)) providing services to a customer premise and not a cellular network. However, particular embodiments may be used with a cellular network. Although this network configuration is described, different networks may be used. Services 108 are shown as being connected to a core network 802. Core network 802 may be an Internet Protocol (IP)/Multiprotocol Label Switching (MPLS) network. An aggregation edge 804 is device providing an entry point into an enterprise or user's network. Different access networks 806 may be used to access content through different user devices 106. Access networks 806 may include wireless and wired access networks. In one embodiment, deferred transfer server 102 is coupled to core network 802. However, deferred transfer server 102 may also be placed in other areas of network 110.

Particular embodiments provide many advantages. For example, when a service provider uses a business model that is offering a fixed download plan, additional revenue is derived from data transfers when users are above the limit. Providing users a chance to download on a deferred basis at a lower rate may cause the users to continue to download data after reaching the limit instead of reducing downloads. This would increase revenue for the service providers. Additionally, deferring large downloads to times when network congestion is lower helps avoid network congestion during peak times. Also, service providers would not need to purchase extra bandwidth to support users during peak hours to alleviate network congestion. The deferral of downloads provides a flat profile of usage of the network. That is, bandwidth usage does not peak and fall as much. Particular embodiments result in better user satisfaction because users get to download at lower rates and deferred transfer also provides more efficient use of network bandwidth.

Particular embodiments also provide a completion time for a user. Thus, the user may not wonder when the download will complete. Rather, monitoring is performed to make sure the download is completed by the completion time.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   determining a request for a transfer of content, the request associated with a user device;
   determining, by a computing device, whether a deferred transfer should be performed;
   receiving a completion time from the user device for a deferred transfer of the content;
   storing the request in a queue, wherein the request is associated with the completion time;
   traversing a linked list of nodes from a start node to an end node associated with each request in the queue to determine if each request can be processed within each request's completion time;
   determining whether to switch nodes for the transfer of the content to the requesting user device based on at least one of:
   whether the completion time is achievable for transferring the content to the requesting user device at a designated node in the linked list based on network congestion,
   whether timeliness for transferring content for each node in the linked list from the start node to the end node is achievable, or
   whether a modification to Quality of Service (QoS) parameters for delivery from the designated node in the linked list enables transfer of the content to the requesting user device by the completion time
   processing the request from the queue to transfer the content at a start time, the content being transferred by the completion time; and
   adjusting, for a user associated with the user device, a charging parameter for the transfer due to the transfer being deferred.

2. The method of claim 1, further comprising:
   outputting one or more options for deferring the transfer of the content; and
   receiving an input from the user selecting an option in the one or more options.

3. The method of claim 2, wherein the one or more options comprise a plurality of options each including a different completion time and a different adjustment of the charging parameter.

4. The method of claim 3, further comprising:
   determining historical data traffic for a network; and
   determining the different completion times for each option in the plurality of options based on the historical data traffic.

5. The method of claim 1, further comprising:
   analyzing a set of requests in the queue to determine if the completion time for the request for deferred transfer is determined to be achievable; and
   if it is determined the completion time is not achievable, adjusting a priority for the request for deferred transfer.

6. The method of claim 5, wherein adjusting the priority comprises adjusting a quality of service (QoS) parameter for the request or moving a position of the request in the queue.

7. The method of claim 1, wherein analyzing comprises:
   determining an amount of content for the request;
   determining the start time for the request;
   determining expected network traffic rate after the start time; and
   determining if the amount of content can be transferred and completed by the completion time based on the start time and the expected network traffic rate.

8. The method of claim 1, wherein adjusting the charging parameter comprises adjusting a rate charged for content transfer.

9. The method of claim 8, wherein a rate plan associated with the user is based on a first charge for a first amount of content transferred and a second charge per data unit above the first amount, wherein adjusting the rate charged comprises:
   adjusting the second charge per data unit or the first charge for the first amount of content transferred in response to the deferred transfer.

10. The method of claim 8, wherein a rate plan comprises a charge for an unlimited amount of content transferred, wherein adjusting the rate comprises reducing the charge for the unlimited amount of content transferred.

11. The method of claim 1, further comprising:
    determining if a size of the transfer is above a first threshold;

if the size of the transfer is above the first threshold, determining the deferred transfer should be performed; and if the size of the transfer is not above the first threshold, determining a non-deferred transfer should be performed.

12. The method of claim 11, further comprising:

if the size of the transfer is above the first threshold, determining if a current network bandwidth is above a second threshold;

if the current network bandwidth is above the second threshold, determining the deferred transfer should be performed; and if the current network bandwidth is below the second threshold, determining non-deferred transfer should be performed.

13. A method comprising:

determining a request for a transfer of content associated with a user device for a user, wherein the user is being charged using a rate plan providing a fixed amount of content transfer for a first charging rate and a second charging rate per unit transferred above the fixed amount;

determining a set of deferral options, a deferral option including a deferred time for transfer and a charging rate adjustment for the first charging rate or the second charging rate;

determining a deferred transfer should be performed based on a selected deferral option in the set of deferral options, the deferred transfer deferring the transfer of the content;

traversing a linked list of nodes from a start node to an end node associated with each request in a deferral queue to determine if each request can be processed within each request's completion time determining whether to switch nodes for the transfer of the content to the requesting user device based on whether timeliness for transferring content for each node in the linked list from the start node to the end node is achievable;

transferring the content based on the deferred time for the selected deferral option; and adjusting the first charging rate or the second charging rate due to the transfer being deferred.

14. The method of claim 13, further comprising:

storing the request in a queue; and monitoring the request in the queue to determine if the transfer of content can be completed by the completion time.

15. The method of claim 14, wherein monitoring comprises:

analyzing a set of requests in the queue to determine if the completion time for the request is determined to be achievable; and if it is determined the completion time is not achievable, adjusting a priority for the request.

16. A non-transitory computer-readable storage medium containing instructions for controlling a computer system to be operable to:

determine a request for a transfer of content, the request associated with a user device;

determine a deferred transfer should be performed, the deferred transfer deferring the transfer of the content with a completion by a completion time;

receive a completion time from the user device for a deferred transfer of the content;

store the request in a queue, wherein the request is associated with the completion time;

traverse a linked list of nodes from a start node to an end node associated with each request in the queue to determine if each request can be processed within each request's completion time;

determine whether to switch nodes for the transfer of the content to the requesting user device based on at least one of:

whether the completion time is achievable for transferring the content to the requesting user device at a designated node in the linked list based on network congestion, whether timeliness for transferring content for each node in the linked list from the start node to the end node is achievable, or whether a modification to Quality of Service (QoS) parameters for delivery from the designated node in the linked list enables transfer of the content to the requesting user device by the completion time process the request from the queue to transfer the content at a start time, the content being transferred by the completion time; and adjust, for a user associated with the user device, a charging parameter for the transfer due to the transfer being deferred.

17. An apparatus comprising:

a customer request insertion manager configured to:

determine a request for a transfer of content, the request associated with a user device; and determine a deferred transfer should be performed, the deferred transfer deferring the transfer of the content with a completion by a completion time;

a queue configured to store the request, wherein the request is associated with the completion time;

traverse a linked list of nodes from a start node to an end node associated with each request in the queue to determine if each request can be processed within each request's completion time determine whether to switch nodes for the transfer of the content to the requesting user device based on at least one of:

whether the completion time is achievable for transferring the content to the requesting user device at a designated node in the linked list based on network congestion, whether timeliness for transferring content for each node in the linked list from the start node to the end node is achievable, or whether a modification to Quality of Service (QoS) parameters for delivery from the designated node in the linked list enables transfer of the content to the requesting user device by the completion time;

a download manager configured to:

process the request from the queue to transfer the content at a start time, the content being transferred by the completion time; and adjust, for a user associated with the user device, a charging parameter for the transfer due to the transfer being deferred.

18. The apparatus of claim 17, further comprising a QoS enabler manager configured to:

analyze a set of requests in the queue to determine if the completion time for the request for deferred transfer is determined to be achievable; and adjust a priority for the request for deferred transfer if it is determined the completion time is not achievable.

19. The apparatus of claim 17, wherein a rate plan associated with the user is based on a first charge for a first amount of content transferred and a second charge per data unit above the first amount, wherein the download manager is configured to:

adjust the second charge per data unit or the first charge for the first amount of content transferred in response to the deferred transfer.

20. The apparatus of claim 17, wherein a rate plan comprises a charge for an unlimited amount of content transferred, wherein the download manager is configured to reduce the charge for the unlimited amount of content transferred.

\* \* \* \* \*